United States Patent
Luo

(10) Patent No.: US 8,175,460 B2
(45) Date of Patent: May 8, 2012

(54) ASYMMETRIC SCHEDULING OF MULTIPLE ANALOG INPUTS USING A SINGLE A/D CONVERTER FOR FIBER-OPTIC TRANSCEIVERS

(75) Inventor: Jun Luo, Singapore (SG)

(73) Assignee: Finisar Corporation, Sunnyvale, CA (US)

( * ) Notice: Subject to any disclaimer, the term of this patent is extended or adjusted under 35 U.S.C. 154(b) by 811 days.

(21) Appl. No.: 12/186,699

(22) Filed: Aug. 6, 2008

(65) Prior Publication Data

US 2009/0047026 A1 Feb. 19, 2009

Related U.S. Application Data

(60) Provisional application No. 60/955,507, filed on Aug. 13, 2007.

(51) Int. Cl.
*H04B 10/24* (2006.01)
(52) U.S. Cl. .................................................. 398/135
(58) Field of Classification Search ........... 398/135–139
See application file for complete search history.

(56) References Cited

U.S. PATENT DOCUMENTS

| | | | | |
|---|---|---|---|---|
| 4,962,495 | A * | 10/1990 | Gibbons et al. | 398/114 |
| 5,491,647 | A * | 2/1996 | O'Brien et al. | 701/99 |
| 7,599,299 | B2 * | 10/2009 | Goetting et al. | 370/241 |
| 2006/0002710 | A1 | 1/2006 | Dybsetter et al. | |
| 2006/0051049 | A1 | 3/2006 | Hahin et al. | |
| 2008/0069569 | A1 | 3/2008 | Nelson et al. | |

* cited by examiner

*Primary Examiner* — Leslie Pascal
(74) *Attorney, Agent, or Firm* — Maschoff Gilmore & Israelsen

(57) ABSTRACT

A firmware control method for the optimized use of a single A/D converter to measure multiple analog signals with asymmetric requirements on sampling rate including a lookup table design procedure and an acquisition algorithm. Since diagnostic analog parameter values require differing sampling rates to be effectively measured, the schedule for converting those values to digital value should correspond to the associated sampling rate. The present invention involves the creation and subsequent implementation of a scheduling table based on the required sampling rates of the operational parameters to be converted.

18 Claims, 5 Drawing Sheets

ASYMMETRIC SCHEDULING OF MULTIPLE ANALOG INPUTS USING A SINGLE A/D CONVERTER FOR FIBER-OPTIC TRANSCEIVERS

CROSS-REFERENCE TO RELATED APPLICATIONS

This application claims the benefit of and priority to U.S. Provisional application Ser. No. 60/955,507, filed Aug. 13, 2007, which application is incorporated herein by reference in its entirety.xz

BACKGROUND OF THE INVENTION

1. The Field of the Invention

The present invention relates generally to optoelectronic communication devices. More specifically, embodiments of the present invention relates to systems and methods for optimizing the conversion of multiple analog signals utilizing one analog to digital converter as controlled by firmware and/or software associated with optoelectronic devices.

2. The Relevant Technology

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications in networks of all sizes.

Typically, data transmission in such networks is implemented by way of an optical transmitter (also referred to as an electro-optic transducer), such as a laser or Light Emitting Diode (LED). The electro-optic transducer emits light when current is passed there through, the intensity of the emitted light being a function of the current magnitude through the transducer. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include an electro-optic transducer driver (e.g., referred to as a "laser driver" when used to drive a laser signal) configured to control the operation of the optical transmitter in response to various control inputs. The optical transceiver also generally includes an amplifier (e.g., often referred to as a "post-amplifier") configured to perform various operations with respect to certain parameters of a data signal received by the optical receiver. A controller circuit (hereinafter referred to the "controller") controls the operation of the laser driver and post amplifier.

In addition to controlling the operation of the laser driver and the post amplifier, the controller may collect and manage diagnostic data. Performance characteristics of an optical transmitter and receiver may vary in response to changes in operational conditions like temperature and voltage. For example, the threshold current and slope efficiency of a laser diode vary with temperature. To ensure the quality and integrity of data transmission, various measurement and compensation circuits may be employed by a transceiver to compensate for these changes. The transceiver controller may evaluate operating conditions, such as, but not limited to, temperature, voltage, and low frequency changes (such as receive power) from the post-amplifier and/or from the laser driver, and then adjust component settings to compensate for any changes. The operating condition parameter values, referred to collectively as "diagnostic data", may also be evaluated by the host computer system which typically has access to the controller via a serial interface.

In evaluating operation conditions, the transceiver's controller receives analog measurements from several sensors, converts the analog signal to a digital value, performs comparison logic with the digital values and predetermined setup data, and, finally, stores the digital operating condition values and the results of the comparison logic (collectively "digital diagnostic data") in the controller's non-volatile memory.

The conversion of the analog operating parameter values into digital values is complicated by several factors including an increasing number of diagnostic parameters to be measured and the varying sampling rate requirements of each parameter. Further, some emerging technologies, such as passive optical networks (PONs) which use a point-to-multipoint topology, may transmit signals in a burst mode which presents an additional challenge due to the transient nature of the signal to be measured.

Assigning a dedicated analog-to-digital (A/D) converter to each signal would allow for individualized sampling rates and accuracies, and thus acquisition timing and results are guaranteed. However, multiple A/D converters would significantly increase component cost which is highly undesirable given the increasingly competitive optical transceiver market segment. In addition, having multiple A/D converters would also increase the footprint of the controller, whereas the trend in the industry is to move to smaller transceiver modules.

Alternatively, to preserve chip space, each signal may be periodically sampled in a round robin fashion using a single A/D converter. In this case, each analog value may be provided to a multiplexer, which selects in a round robin fashion, one of the signals at a time for sampling by the A/D converter. This method may work when all of the signals to be measured have the same sampling rate. However, when used in applications having highly asymmetrical sampling rates, the result is that fast signals are under-sampled and slower signals are over-sampled.

Further, the implementation of one ultra-fast A/D converter is undesirable due to the high power consumption and increased electrical noise associated with ultra-fast A/D converters. Among other problems, the increased electrical noise causes the deterioration of the front ends of weak analog signals and may violate the EMI regulations governing communications equipment.

Therefore, an optical transceiver capable of scheduling efficiently several signals having asymmetric sampling rate requirements for conversion with one A/D converter would be advantageous.

BRIEF SUMMARY OF THE INVENTION

These and other limitations are overcome by embodiments of the invention which relate to systems and methods for optimizing the conversion of multiple analog signals utilizing one analog to digital converter as controlled by firmware and/or software associated with optoelectronic devices.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

The collection and management of transceiver diagnostic data involves receiving analog measurements from several sensors and converting the analog operational parameter values into digital values for comparison with predetermined setup data. Depending on the properties of the analog operational parameter being measured, a particular sampling rate is often required to effectively measure the parameter. Since each analog parameter measured may require a different sampling rate, the schedule to convert each parameter to a digital format should correspond to the required sampling rate for that signal. Embodiments of the present invention relate to systems and methods for optimizing the scheduling of the analog to digital conversion by considering the different sampling rates for each signal. Specifically, the present invention involves the creation and subsequent implementation of a scheduling lookup table based on the required sampling rates of the operational parameters to be converted.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE SELECTED EMBODIMENTS

The principles of the present invention relates to systems and methods for optimizing the conversion of multiple analog signals utilizing one analog to digital converter as controlled by firmware and/or software associated with optoelectronic devices.

The behavior of several optical transceiver components, such as the receiver, the post-amplifier, the laser driver, and the transmitter, may vary dynamically due to a number of factors. For example, temperature changes, power fluctuations, and feedback conditions may each affect the performance of these components. To ensure the quality and integrity of data transmission, various measurement and compensation circuits are employed to compensate for these changes. The measurement and compensation circuits are managed by the control module of the transceiver.

The controller collects and evaluates diagnostic data, such as, but not limited to, temperature, voltage, and low frequency changes (such as receive power) from the post-amplifier and/or from the laser driver. In evaluating operation conditions, the controller receives analog measurements from several sensors, converts the analog signal to a digital value, performs comparison logic with the digital values and predetermined setup data, and, finally, stores the digital operating condition values and the results of the comparison logic (collectively "digital diagnostic data") in the controller's non-volatile memory. This allows the controller to optimize the dynamically varying performance, and additionally detect when there is a loss of signal. Specifically, the controller may counteract these changes by adjusting settings on the post-amplifier and/or the laser driver.

As mentioned above, the collection and management of diagnostic data involves receiving analog measurements from several sensors and converting the analog operational parameter values into digital values for comparison with predetermined setup data. Depending on the properties of the analog operational parameter being measured, a particular sampling rate is often required to effectively measure the parameter. Since each analog parameter measured may require a different sampling rate, the schedule to convert each parameter to a digital format should correspond to the required sampling rate for that signal. Embodiments of the present invention relate to systems and methods for optimizing the scheduling of the analog to digital conversion by considering the different sampling rates for each signal. Specifically, the present invention involves the creation and subsequent implementation of a scheduling table based on the required sampling rates of the operational parameters to be converted.

An example operational optical transceiver environment will first be described. Then, the operation in accordance with the invention will be described with respect to the operational environment. Finally, the process for creating the scheduling table will be described.

Figure 1:
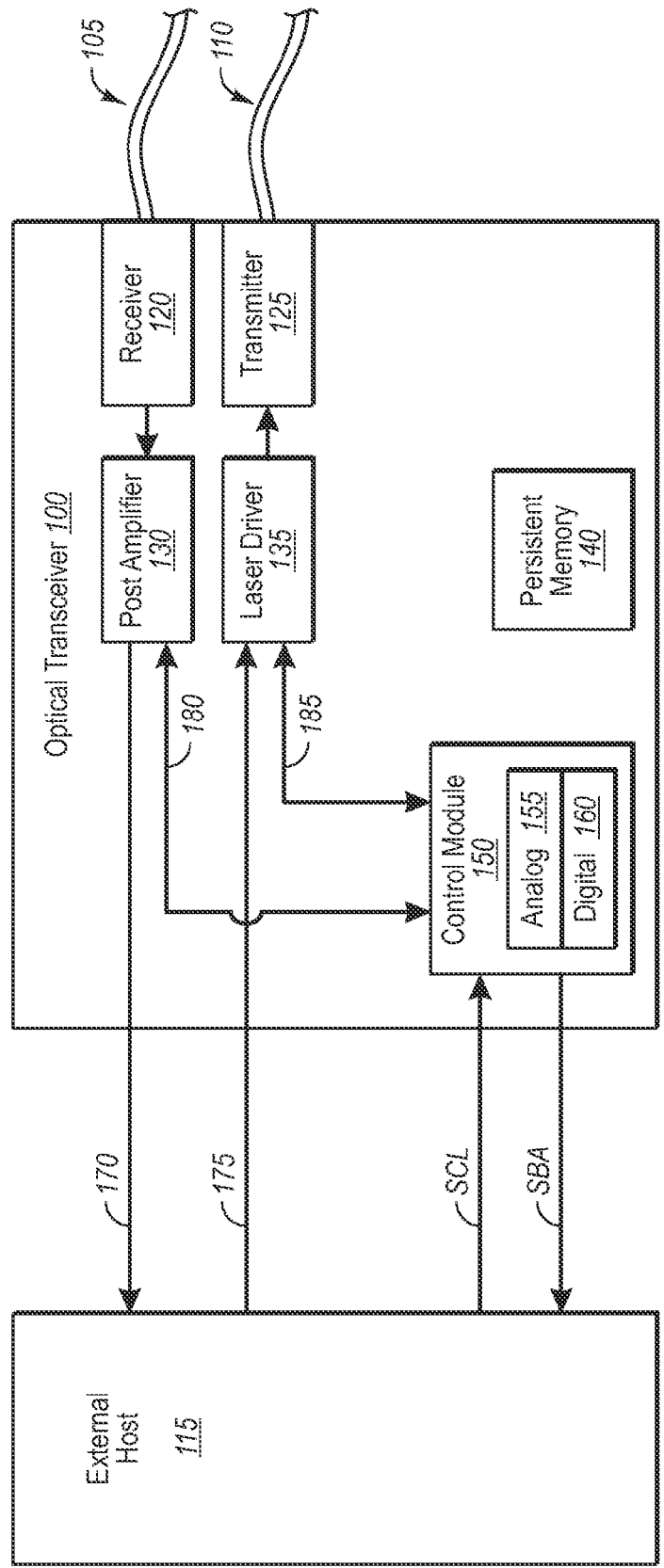
FIG. 1 schematically illustrates an example of an optical transceiver that may implement features of the present invention.

FIG. 1 illustrates an optical transceiver 100 in which the principles of the present invention may be employed. While the optical transceiver 100 will be described in some detail, the optical transceiver 100 is described by way of illustration only, and not by way of restricting the scope of the invention. The principles of the present invention are suitable for 1 G, 2 G, 4 G, 8 G, 10 G and higher bandwidth fiber optic links. Furthermore, the principles of the present invention may be implemented in optical (e.g., laser) transmitter/receivers of any form factor such as XFP, SFP and SFF, without restriction. Having said this, the principles of the present invention are not limited to an optical transceiver environment at all.

The optical transceiver 100 receives an optical signal from fiber 105 using receiver 120. The receiver 120 acts as an opto-electric transducer by transforming the optical signal into an electrical signal. The receiver 120 provides the resulting electrical signal to a post-amplifier 130. The post-amplifier 130 amplifies the electrical signal and provides the amplified signal to an external host 115 as represented by arrow 170. The external host 115 may be any computing system capable of communicating with the optical transceiver 100.

The optical transceiver 100 may also receive electrical signals from the host 115 for transmission onto the fiber 110. Specifically, the laser driver 135 receives an electrical signal from host 115 as represented by the arrow 175, and drives the transmitter 125 (e.g., a laser or Light Emitting Diode (LED)) to emit optical signals onto the fiber 110, where optical signals are representative of the information in the electrical signal provided by the host 115. Accordingly, the transmitter 125 serves as an electro-optic transducer.

The behavior of the receiver 120, the post-amplifier 130, the laser driver 135, and the transmitter 125 may vary dynamically due to a number of factors. For example, temperature changes, power fluctuations, and feedback conditions may each affect the performance of these components. Accordingly, the optical transceiver 100 includes a control module 150, which may evaluate operating conditions, such as, but not limited to, temperature, voltage, and low frequency changes (such as receive power) from the post-amplifier 130 (as represented by arrow 180) and/or from the laser driver 135 (as represented by arrow 185). This allows the control module 150 to optimize the dynamically varying performance, and additionally detect when there is a loss of signal.

Specifically, the control module 150 may counteract these changes by adjusting settings on the post-amplifier 130 and/or the laser driver 135 as also represented by the arrows 180 and 185. These settings adjustments are quite intermittent since they are only made when operating conditions so warrant. The control module 150 includes both an analog portion 155 and a digital portion 160. Together, portions 155 and 160 allow the control module to implement logic digitally, while still largely interfacing with the rest of the optical transceiver 100 using analog signals. The control module 150 can communicate with host 115 using, for example, a two-wire I2C interface shown as the serial data (SDA) and serial clock (SCL) lines.

The control module 150 may have access to a persistent memory 140, which in one embodiment, is an Electrically Erasable and Programmable Read Only Memory (EEPROM). The persistent memory 140 and the control module 150 may be packaged together in the same package or in different packages without restriction. Persistent memory 140 may also be any other non-volatile memory source.

Figure 2:
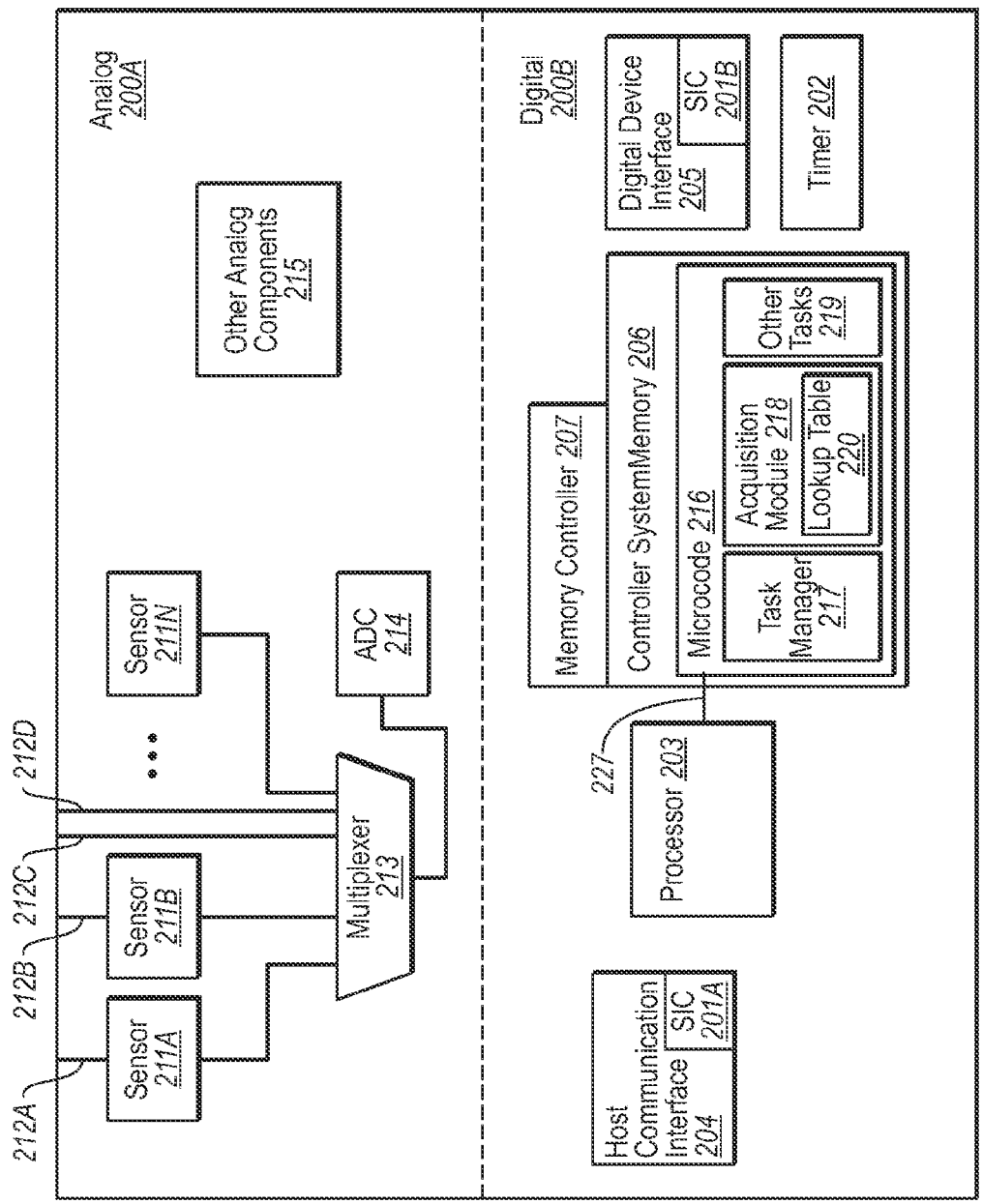
FIG. 2 schematically illustrates an example of a control module of FIG. 1.

FIG. 2 schematically illustrates an example of a control module 200 in further detail. The control module 200 includes an analog portion 200A that represents an example of the analog portion 155 of FIG. 1, and a digital portion 200B that represents an example of the digital portion 160 of FIG. 1. The analog portion 200A includes sensors 211A, 211B to 211N. The sensors can receive information on operational parameters internally of the control module 200 itself such as, for example, supply voltage and transceiver temperature. The sensors can also receive external analog or digital signals from other components of the optical transceiver that indicate other operational parameters such as, for example, laser bias current, transmit power, receive power, laser wavelength, laser temperature, and Thermo Electric Cooler (TEC) current. Two external lines 212A and 212B are illustrated for receiving such external analog signals although there could be many of such lines. The control module can also receive operational parameters from sensors located outside of the control module, which is represented by lines 212C and 212D.

The internal sensors may generate analog signals that represent the measured values. In addition, the externally provided signals 212A, 212B, 212C, 212D may also be analog signals. In this case, in order to preserve chip space, the analog signals are converted to digital signals by a single A/D converter 214. A multiplexer 213 is responsible for controlling the sampling of the signals from sensors 211A, 211B through 211N as well as any externally provided signals 212C, 212D. The multiplexer 213 is controlled by a scheduling module located at the digital portion 200B, described in more detail below.

The analog portion 200A of the control module 200 may also include other analog components 215 such as, for example, digital to analog converters, other analog to digital converters, high speed comparators (e.g., for event detection), voltage based reset generators, voltage regulators, voltage references, clock generator, and other analog components.

The digital portion 200B of the control module 200 may include a timer module 202 that provides various timing signals used by the digital portion 200B. Such timing signals may include, for example, programmable processor clock signals. The timer module 202 may also act as a watchdog timer. A general-purpose processor 203 is also included. The processors recognize instructions that follow a particular instruction set, and may perform normal general-purpose operation such as shifting, branching, adding, subtracting, multiplying, dividing, Boolean operations, comparison operations, and the like.

A host communications interface 204 is used to communicate with the host (depicted in FIG. 1 as lines SBA and SCL). Other host communication interfaces may be implemented. Control module 150 transmits data to the host 115 using host communications interface 204 to allow for digital diagnostics and readings of temperature levels, transmit/receiver power levels, and the like. The external device interface 205 is used to communicate with, for example, other external components of the optical transceiver 100 such as, for example, the post-amplifier 130, the laser driver 135, and/or the persistent memory 140.

The internal controller system memory 206 (not to be confused with the external persistent memory 140) may be Random Access Memory (RAM) or non-volatile memory. Any type of non-volatile memory can be used for memory 206 without constraint. Types of memory include, but are not limited to, flash, EEPROM, and the like, depending on design constraints, product manufacturability, and other considerations. The memory controller 207 shares access to the controller system memory 206 with the processor 203, the host communication interface 204, and the external device interface 205. In one embodiment, the host communication interface 204 includes a serial interface controller 201A, and the external device interface 205 includes a serial interface controller 201B. The two serial interface controllers 201A and 201B may communicate using a two-wire interface such as I2C or any other interface recognizable by both communicating modules. This enables the two serial interface controllers 201A and 201B to operate in a master/slave relationship, which configuration is known by those of skill in the art and will not be discussed in detail.

In accordance with the present invention, as also shown in FIG. 2, the processor 203 executes microcode 216 resident in system memory 206 as illustrated by line 227. The microcode, also known as firmware, typically consists of various functional task modules and a task manager 217. The task manager 217 may be a sophisticated real-time operation system (RTOS) that adopts one of various scheduling algorithms appreciated by those of skill in the art, or a mini-kernel specially made for the transceiver application. The task manager 217 may also be as simple as a main loop which simply executes each task one by one. The functional task modules may include acquisition, calibration, compensation, host interface, etc, as determined by each implementation. Among all the task modules, the acquisition module 218 is of particular interest by the present invention and the rest are collectively illustrated as 219.

The acquisition module 218 sequences and controls the sampling and quantization of multiple analog signals to operational parameters. The parameters may include but are not limited to temperatures, supply voltages, receiver optical powers, transmit optical powers and biases. In particular, the acquisition module adopts a lookup table 220 that configures the schedule of analog conversion.

Having described a specific environment with respect to FIGS. 1 and 2, it will be understood that this specific environment is only one of countless hardware and software architectures in which the principles of the present invention may be employed. As previously stated, the principles of the present invention are not intended to be limited to any particular environment.

Figure 3:
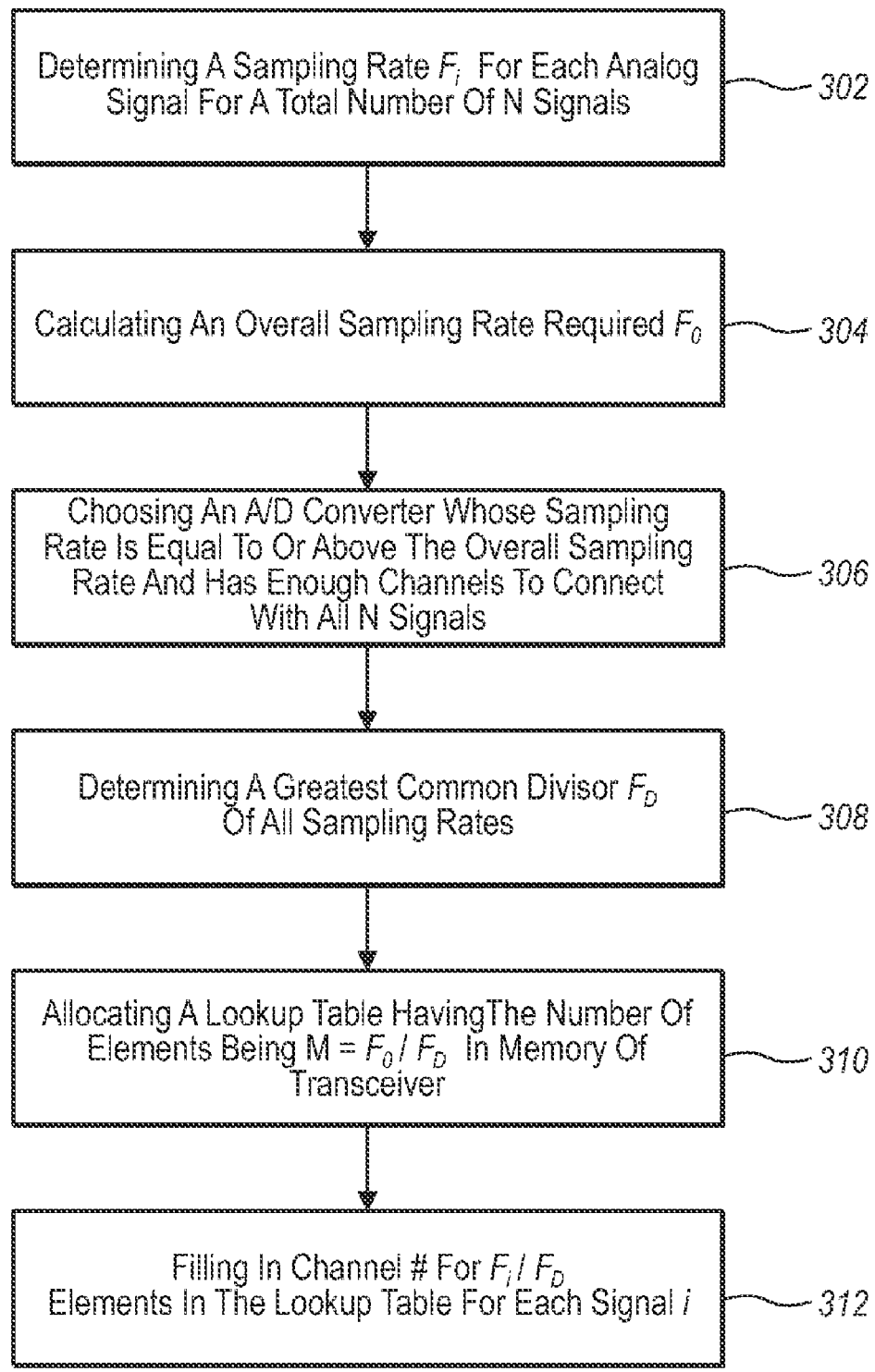
FIG. 3 illustrates a flowchart of a method for designing a lookup table for use with the scheduling methods of the present invention.

FIG. 3 illustrates a design method 300 of the lookup table 220, step by step. At 302, the designer determines the sampling rate required for each analog signal to be measured and denotes the rate as $F_i$ in Hz, where i=1~N and N is the total number of signals. At 304, the overall sampling rate required is determined by $$F_O = \sum_{i=1 \sim N} F_i$$

in Hz. At 306, an A/D converter, either standalone or built in a microcontroller, is chosen with sampling rate equal to or above $F_O$ when working at desired resolution. The A/D converter must be chosen with enough channels to accommodate all N signals. At 308, the greatest common divisor $F_D$ of all $F_i$ is obtained by $$F_D = \underset{i=1 \sim N}{GCD}\{F_i\}.$$

At 310, a lookup table is allocated in non-volatile memory 206, with length in elements being $M=F_O/F_D$. Each element of the table contains the channel # of an analog signal to be measured. For signal i, its channel #, which is i in value, is filled for $F_i/F_D$ elements in the lookup table. To achieve the consistent sampling interval, the $F_i/F_D$ elements of the i-th signal shall be spread as evenly as possible in the table.

Figure 4:
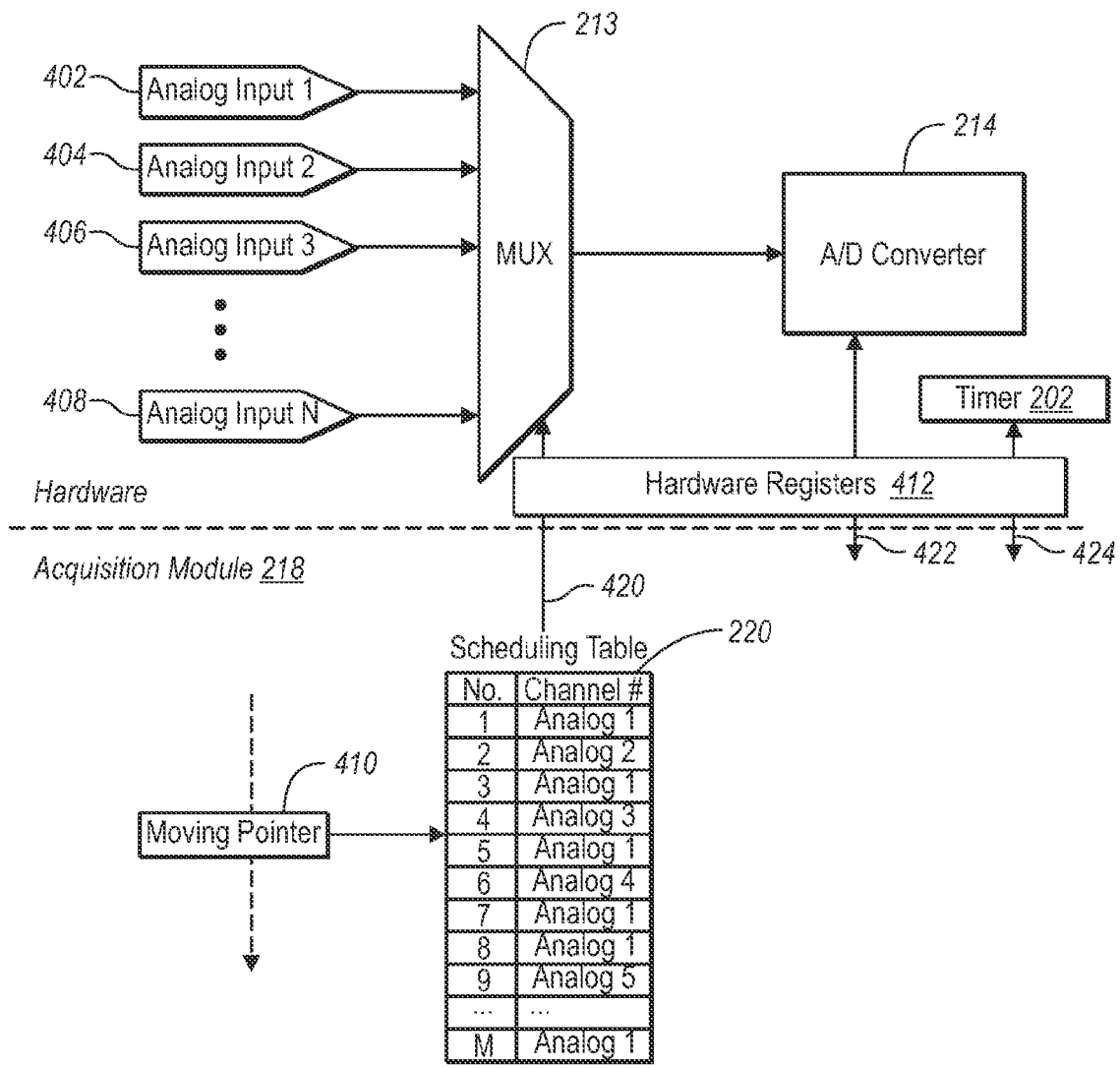
FIG. 4 pictorially depicts the interaction between hardware and software to implement the scheduling features of the present invention.
Figure 5:
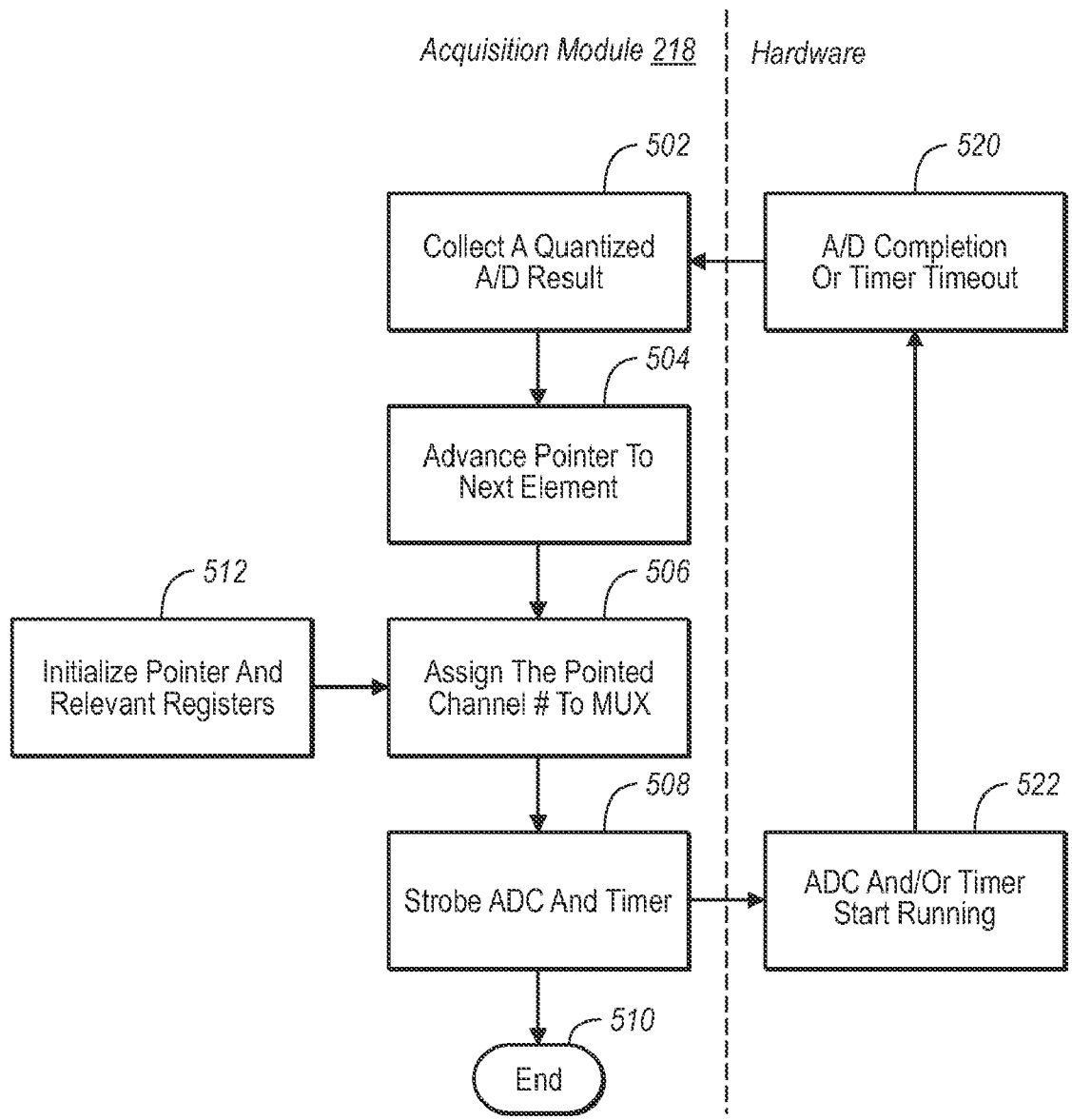
FIG. 5 illustrates a flowchart of a method for scheduling sampling of analog signals, according to one embodiment of the invention.

FIG. 4 illustrates the block diagram of acquisition module 218, lookup table 220, and relevant hardware. FIG. 5 is a flow chart depicting the operation and interaction of the elements of FIG. 4. Generally, firmware controls and queries hardware via a set of hardware registers 412 as appreciated by those of skill in the art. Additionally, one acquisition session may be started by a timer interrupt if periodic sampling is required or by an A/D completion interrupt if maximum throughput is desired or by an external interrupt if immediate measurement is needed upon notification. These interrupts may be combined to achieve adaptive acquisition that accommodates varying conditions at runtime. Alternatively, polling of A/D status and/or timer status by firmware can be used instead of interrupts as also generally appreciated in the art. In this case, the acquisition module may not be executed until a time slice is granted to it by task manager 217. Hereinafter "A/D completion" and "timer timeout" refer to both interrupt and polling cases.

Upon an A/D completion and/or timer timeout 520, a new acquisition session is flagged as illustrated as 422 and 424 respectively, which can be hardware interrupts or firmware polling of registers 412 as mentioned above. Upon execution, at 502, the acquisition module 218 first collects an A/D result converted by A/D converter 214 via accessing relevant registers 422 and puts the A/D result at a proper location for follow-up by other firmware module like calibration or compensation. This is followed by step 504 that advances the pointer 410 to next element of table 220. If the pointer is found going beyond the table end, i.e., after the M element, it will be reset to the first element.

At step 506, the element pointed to by pointer 410 has its content, i.e., a channel #, loaded into relevant MUX selection register 412 as illustrated as 420. The multiplexer 213 then channels the selected analog signal to the A/D converter 214. After allowing a setup time for the analog signal to stabilize at the A/D converter input, the firmware 218 will strobe a new A/D conversion by setting proper register 412 as illustrated as 422 at step 508. If applied, a timer will also be set by writing its register 412 as illustrated as 424. Since an A/D conversion is just started (522) and the result is unavailable for certain time, the acquisition module 218 shall exit interrupt service or return CPU control to task manager 217, depending on whether interrupt or polling is used. Once an A/D completion and/or timer timeout 520 occur later on, the above operation will be reiterated.

Before entering the above-mentioned iterative operation, the acquisition module 218 needs to do some initialization as illustrated by 512. Specifically, pointer 410 is set pointed to the element corresponding to the first channel to be measured, which can be simply the first element in table 220. Some relevant registers 412 may also be preset to proper values, depending on specific firmware implementation and microcontroller in use. They typically include but are not limited to clock frequency of the A/D converter and timer, selection of the A/D converter reference voltage, mode of the A/D converter and timer, and individual interrupt enable for the A/D converter and timer.

In practice, pointer 410 may be implemented as a type of pointer to an integer according to the syntax of a modern high-level computer language like C/C++. It may also be embodied as an integer index or equivalent as appreciated by one of skill in the art.

It should be noted that the filled-in values in table 220 in FIG. 4 are for illustrative purpose only. FIG. 4 assumes that analog signal 1 requires a sampling rate much higher than the others. As such, the analog signal 1 appears in more elements in the lookup table than the other signals. The number of elements in the lookup table, denoted as M in the illustration and design procedure, has no direct connection with N. Advantageously, if there is a constraint on the size of the lookup table, M, which is typically small, may further be reduced at the manageable sacrifice of time allocation granularity. This is done by reducing $F_i$ proportionally for i=1~N, provided that $F_i$ is still larger than or equal to 1.

By scheduling acquisitions in the above-described manner, the present invention provides a firmware control method for optimized use of a single A/D converter to measure multiple analog signals with asymmetric requirements on sampling rate, consisting of a lookup table design procedure and an acquisition algorithm described above, which provides, among other things, the following advantages.

As can be appreciated by those of skill in the art, reducing component costs is a critical factor to the marketing success of transceivers, particularly in products where the profit margin is extremely sensitive to component costs, such as Passive Optical Networking (PONs) applications that are based on Fiber to the Home (FTTH) technology. By improving efficiency of use of only one A/D converter, this invention reduces the component cost incurred by solutions with multiple A/D converters.

With the present invention, addition, modification, and removal of a signal to be quantized are greatly simplified. A designer can easily achieve these by editing the scheduling lookup table straightforwardly instead of abstract coding in computer language like C/C++. The improved productivity and shortened development cycle further reduce the overall product design cost.

The present invention is not limited to a set or certain number of analog signals. Rather, the number of signals that a designer can measure, denoted as N in the Figures, is arbitrary. In one embodiment, an A/D converter with eight channels can serve the requirement well.

In addition, the present invention can enhance other controls that can be used in combination with the present invention. For example, a dual-mode control algorithm with a normal mode at burst-off time and a fast mode at burst-on time can be combined with this invention for ideal performance for burst-featured transceiver applications.

Embodiments included general-purpose and/or special-purpose devices or systems that include both hardware and/or software components. Embodiments may also include physical computer-readable media and/or intangible computer-readable media for carrying or having computer-executable instructions, data structures, and/or data signals stored thereon. Such physical computer-readable media and/or intangible computer-readable media can be any available media that can be accessed by a general purpose or special purpose computer. By way of example, and not limitation, such physical computer-readable media can include RAM, ROM, EEPROM, CD-ROM or other optical disk storage, magnetic disk storage or other magnetic storage devices, other semiconductor storage media, or any other physical medium which can be used to store desired data in the form of computer-executable instructions, data structures and/or data signals, and which can be accessed by a general purpose or special purpose computer. Within a general purpose or special purpose computer, intangible computer-readable media can include electromagnetic means for conveying a data signal from one part of the computer to another, such as through circuitry residing in the computer.

When information is transferred or provided over a network or another communications connection (either hardwired, wireless, or a combination of hardwired or wireless) to a computer, hardwired devices for sending and receiving computer-executable instructions, data structures, and/or data signals (e.g., wires, cables, optical fibers, electronic circuitry, chemical, and the like) should properly be viewed as physical computer-readable mediums while wireless carriers or wireless mediums for sending and/or receiving computer-executable instructions, data structures, and/or data signals (e.g., radio communications, satellite communications, infrared communications, and the like) should properly be viewed as intangible computer-readable mediums. Combinations of the above should also be included within the scope of computer-readable media.

Computer-executable instructions include, for example, instructions, data, and/or data signals which cause a general purpose computer, special purpose computer, or special purpose processing device to perform a certain function or group of functions. Although not required, aspects of the invention have been described herein in the general context of computer-executable instructions, such as program modules, being executed by computers, in network environments and/or non-network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

Embodiments may also include computer program products for use in the systems of the present invention, the computer program product having a physical computer-readable medium having computer readable program code stored thereon, the computer readable program code comprising computer executable instructions that, when executed by a processor, cause the system to perform the methods of the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing an acquisition session using microcode stored in memory of an optical transceiver for use by the optical transceiver to schedule analog to digital conversion of multiple analog signals using a single analog-to-digital (A/D) converter, the method for performing an acquisition session comprising:

receiving confirmation that conversion of a current analog signal corresponding to a current entry in a lookup table was completed or that a timer corresponding to a conversion operation of the A/D converter timed out;

collecting an A/D conversion result of the current analog signal corresponding to the current entry;

advancing a pointer in the lookup table from the current entry to a next entry;

loading content of the next entry into a corresponding selection register of a multiplexer such that a next analog signal identified by the content is channeled to the A/D converter by the multiplexer; and strobing the A/D converter.

2. The method as recited in claim 1, further comprising resetting the pointer to advance to a first entry in the lookup table when the current entry of the pointer is a last entry in the lookup table.

3. The method as recited in claim 1, wherein the pointer is implemented as a pointer to an integer according to syntax of a high-level computer language.

4. The method as recited in claim 1, wherein the pointer is implemented as an integer index.

5. The method as recited in claim 1, wherein collecting an A/D conversion result is initiated by a timer interrupt.

6. The method as recited in claim 1, wherein collecting an A/D conversion result is initiated by an A/D completion interrupt.

7. The method as recited in claim 1, wherein collecting an A/D conversion result is initiated by polling of A/D status.

8. The method as recited in claim 1, wherein collecting an A/D conversion result is initiated by polling of timer status.

9. An optical transceiver configured to execute a number of tasks based on operational parameters of the optical transceiver, the transceiver comprising:

at least one processor; and a system memory comprising a physical computer-readable medium having scheduling microcode stored thereon, the scheduling microcode comprising executable instructions that, when executed by the processor, cause the transceiver to perform operations comprising:

receiving confirmation that conversion of a current analog signal corresponding to a current entry in a lookup table was completed or that a timer corresponding to a conversion operation of an analog-to-digital (A/D) converter timed out;

collecting an A/D conversion result of the current analog signal corresponding to the current entry;

advancing a pointer in a lookup table from the current entry to a next entry;

loading content of the next entry into a corresponding selection register of a multiplexer such that a next analog signal identified by the content is channeled to the A/D converter by the multiplexer; and strobing the A/D converter.

10. The transceiver as recited in claim 9, wherein the operational parameters of the optical transceiver include at least one of a supply voltage, a temperature, a laser bias current, a transmit power, a receive power, a laser wavelength, a laser temperature, and a Thermo Electric Cooler current.

11. The transceiver as recited in claim 9, further comprising a standalone A/D converter.

12. The transceiver as recited in claim 9, further comprising an A/D converter integrated into a microcontroller.

13. A method for performing an acquisition session, the method comprising:

initializing a pointer in a lookup table to an initial entry;

initializing one or more registers of a multiplexer to one or more initial values;

loading content of the initial entry into a corresponding selection register of the multiplexer such that an initial analog signal identified by the content is channeled to an analog-to-digital (A/D) converter by the multiplexer;

strobing the A/D converter;

receiving confirmation that conversion of the initial analog signal corresponding to the initial entry was completed or that a timer corresponding to a conversion operation of the A/D converter timed out; and collecting an A/D conversion result of the initial analog signal corresponding to the initial entry.

14. The method of claim 13, further comprising performing analog to digital conversion of multiple analog signals using the A/D converter by iterating as follows:

advancing a pointer in the lookup table from a current entry to a next entry;

loading content of the next entry into a corresponding selection register of the multiplexer such that a next analog signal identified by the content is channeled to the A/D converter by the multiplexer;

strobing the A/D converter;

receiving confirmation that conversion of the next analog signal corresponding to the next entry in the lookup table was completed or that a timer corresponding to a conversion operation of the A/D converter timed out; and collecting an A/D conversion result of the next analog signal corresponding to the next entry.

15. The method of claim 14, further comprising resetting the pointer to advance to the initial entry in the lookup table when the current entry of the pointer is a last entry in the lookup table.

16. The method of claim 13, wherein the pointer is implemented as at least one of:

a pointer to an integer according to syntax of a high-level computer language; or an integer index.

17. The method of claim 13, wherein collecting an A/D conversion result is initiated by at least one of:

a timer interrupt;

an A/D completion interrupt;

polling of A/D status; or polling of timer status.

18. The method of claim 13, wherein the one or more registers of the multiplexer control at least one of:

a clock frequency of the A/D converter;

a reference voltage of the A/D converter;

a mode of the A/D converter and/or a mode of a timer; or interrupt enable for the A/D converter and/or timer.

\* \* \* \* \*